United States Patent
Reichinger et al.

(10) Patent No.: US 9,112,431 B2
(45) Date of Patent: Aug. 18, 2015

(54) METHOD AND DEVICE FOR THE CALIBRATION A PIEZO-ACTUATOR THAT IS ACTUATED IN A MOTOR VEHICLE FOR DRIVING A SWITCHING VALVE

(75) Inventors: Christian Reichinger, Neutraubling (DE); Walter Schrod, Regensburg (DE); Hans-Jörg Wiehoff, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1025 days.

(21) Appl. No.: 12/742,896

(22) PCT Filed: Nov. 14, 2008

(86) PCT No.: PCT/EP2008/065551
§ 371 (c)(1),
(2), (4) Date: Jul. 7, 2010

(87) PCT Pub. No.: WO2009/063047
PCT Pub. Date: May 22, 2009

(65) Prior Publication Data
US 2010/0268440 A1  Oct. 21, 2010

(30) Foreign Application Priority Data

Nov. 14, 2007 (DE) .......................... 10 2007 054 374

(51) Int. Cl.
*F02D 41/30* (2006.01)
*G01R 27/00* (2006.01)
(Continued)

(52) U.S. Cl.
CPC ............ *H02N 2/065* (2013.01); *F02D 41/2096* (2013.01); *F02D 41/2438* (2013.01);
(Continued)

(58) Field of Classification Search
CPC ............ F02D 41/2096; F02D 41/2429; F02D 41/2432; F02D 41/2441; F02D 41/2438; F02D 41/2467; F02M 2200/702; F02M 51/0603
USPC ........ 324/601; 310/311, 316.01, 316.03, 317, 310/318, 324, 328
See application file for complete search history.

(56) References Cited

U.S. PATENT DOCUMENTS 6,340,858 B1   1/2002  Jaenker .......................... 310/328
6,487,505 B1  11/2002  Mock et al. .................... 702/33
(Continued)

FOREIGN PATENT DOCUMENTS

DE   19804196   8/1999   ............. G01R 31/00
DE   19902413   5/2000   ............. G05D 3/10
(Continued)

OTHER PUBLICATIONS

Bechmann et al., IRE Standards on Piezoelectric Crystals: Determination of Elastic, Piezoelectric, and Dielectric Constants—The Electromechanical Coupling Factor, 1958, Institute of Radio Engineers, all.*

(Continued)

*Primary Examiner* — Thomas F Valone
(74) *Attorney, Agent, or Firm* — Slayden Grubert Beard PLLC (57) ABSTRACT

In a method for calibration, a piezo-actuator (1) is actuated in a motor vehicle by a control circuit and an output stage. The piezo actuator is, in particular, part of the injection valve. The piezo-actuator (1) is subjected to an electric calibration pulse that is in the high-level signal range thereof when the control circuit and the output stage are in operation, the frequency thereof being modified over time. The associated electric impendence curve over the frequency is determined and evaluated during the calibration pulse. The output stage is controlled by the control circuit in such a manner that the calibration pulse is generated.

18 Claims, 3 Drawing Sheets

(51) Int. Cl.
*H01L 41/09* (2006.01)
*H02N 2/06* (2006.01)
*F02D 41/20* (2006.01)
*F02D 41/24* (2006.01)
*F02M 51/06* (2006.01)

(52) U.S. Cl.
CPC ....... *F02D41/2467* (2013.01); *F02M 51/0603* (2013.01); *F02M 2200/701* (2013.01); *F02M 2200/702* (2013.01)

(56) References Cited

U.S. PATENT DOCUMENTS

| | | | | |
|---|---|---|---|---|
| 6,768,312 | B2* | 7/2004 | Sun et al. | 324/525 |
| 7,016,780 | B2 | 3/2006 | Graf et al. | |
| 2004/0179881 | A1* | 9/2004 | White et al. | 400/124.01 |
| 2005/0179743 | A1* | 8/2005 | Hirota et al. | 347/65 |
| 2005/0199221 | A1 | 9/2005 | Dietl et al. | |
| 2006/0061615 | A1* | 3/2006 | Yagi | 347/19 |
| 2008/0218027 | A1 | 9/2008 | Gottlieb et al. | |

FOREIGN PATENT DOCUMENTS

| | | | | |
|---|---|---|---|---|
| DE | 10025579 | A1 | 12/2001 | F02D 41/20 |
| DE | 102006002736 | A1 | 8/2007 | F02D 41/20 |
| DE | 102005042107 | A1 | 9/2007 | H02N 2/06 |
| DE | 102006011725 | | 9/2007 | H02N 2/06 |
| JP | 2003243739 | A | 8/2003 | F02D 41/20 |

OTHER PUBLICATIONS

Translation of Description of DE10200611725.*
International Search Report and Written Opinion for Application No. PCT/EP2008/065551 (11 pages), Mar. 25, 2009.

* cited by examiner

METHOD AND DEVICE FOR THE CALIBRATION A PIEZO-ACTUATOR THAT IS ACTUATED IN A MOTOR VEHICLE FOR DRIVING A SWITCHING VALVE

CROSS-REFERENCE TO RELATED APPLICATIONS

This application is a U.S. National Stage Application of International Application No. PCT/EP2008/065551 filed Nov. 14, 2008, which designates the United States of America, and claims priority to German Application No. 10 2007 054 374.5 filed Nov. 14, 2007, the contents of which are hereby incorporated by reference in their entirety.

TECHNICAL FIELD

The present invention relates to a method and a device for calibrating a piezoelectric actuator used in a motor vehicle for the purpose of driving a control valve.

BACKGROUND

Piezoelectric actuators are used in the automotive industry above all as final control elements for metering devices, consequently in particular for injection valves. They enables extremely fast switching of the control valve encompassed by the injection valve and thus allow, for example, a plurality of injection operations during a working cycle of a cylinder of an internal combustion engine. Piezoelectric actuating elements are also used increasingly in other sectors of the automotive industry, e.g. in braking systems.

Today's state-of-the-art engine management systems for combustion engines aim to provide operation producing the lowest possible exhaust emissions and fuel consumption, as well as to comply with (future) statutory framework regulations. The control system behavior of combustion engines is to be characterized as nonlinear owing to the dynamics of gasoline exchange and combustion and exhibits a marked temperature dependence. The mixture forming processes are influenced essentially by gasoline exchange, injection quantity, and injection profile. A crucial task is handled in this case by the precise control of the injection components. In this case injection quantity precision and injection time instant are elementary parameters for an optimal configuration of the combustion profiles. Modern injection elements, such as are used e.g. in common-rail or pump-injector systems, are already operated today with the aid of piezoelectric-controlled control valves.

One advantage of the piezoelectric-controlled control valves is, inter alia, that they not only act as an actuator, but by exploiting the piezoelectric effect can also be used as sensors. Information concerning deflection and acting forces, attrition or idle stroke can be generated in the process from the inherent sensor-like properties of said piezoelectric elements. Based on said information acquisition it is possible to construct regulation and control concepts which can precisely regulate internal system pressures and valve needle strokes with the aid of the energy balance of the actuating element.

However, said actuating elements also have disadvantages which are inherent in the nonlinear and hysteresis-affected behavior of the piezoelectric element itself. Contrary to the usual assumption, the material coefficients defining the behavior of the piezoelectric element are not independent constants, since said known 'material constants' describe the material properties only under small-signal conditions. In fact, however, their size varies with temperature, pressure and other boundary conditions, such that the behavior of complex components, such as piezoelectric-controlled injection valves, for which precise control is particularly important, cannot be adequately predicted under real-world usage conditions by means of a linear approach, in particular the assumption of a constant piezoelectric module $d_{ij}$. In the case of temperature and load changes the piezoelectric actuators have e.g. different coefficients of expansion (piezoelectric module) which in turn can be regulated only to a limited degree over all operating points and useful life by means of currently used linear regulation concepts and in view of the, for technical reasons, very high manufacturing tolerances of piezoelectric actuators.

In order to determine the material coefficients of piezoelectric elements, methods are known in the prior art which are resorted to on the one hand for small-signal measurements in which, as a consequence, only a comparatively low electrical energy (e.g. a few V/mm) is applied to the piezoelectric element. Known in particular in this context are impedance spectroscopy measurement methods with the aid of which it is fundamentally possible to determine the full data set of the elastic, dielectric and piezoelectric material parameters. Toward that end the piezoceramic sample is subjected to a sinusoidal alternating field in a predefined frequency range and its impedance is recorded as a function of the frequency by means of a commercially available impedance analyzer. In this case the resonance frequencies of piezoelectric test specimens of different geometries are measured. Through the combination of different oscillation modes it is possible to determine the complete data set of the piezoelectric element. Even if specific material coefficients are already predefined from other measurements and only one sample is measured in detail, said method is a relatively complex and cost-intensive laboratory method. The required investment in hardware for the computing power to be used therein appears not to be justifiable in practice outside of laboratory tests.

For measurements in the large-signal operating mode, on the other hand, the deflection and force of the piezoelectric element which occur during the activation by means of a corresponding field strength are currently measured directly. Highly complex measurements of this kind, in which the paths are very small and the forces very large, cannot be carried out without major difficulties during the operation of a piezoelectrically driven injection valve.

DE 198 04 196 A1 discloses a method for diagnosing a piezoelectric-mechanical system of an injection system currently in operation, wherein use is made of the fact that the state of the mechanical subsystem (to which the mechanical environment of the piezoelectric element also belongs) influences the electrical parameters of the piezoelectric element in a characteristic way, with the result that it is possible to detect malfunctions in the mechanical operation of the piezoelectric-mechanical system by recording and evaluating said electrical parameters. It is also known in this case to drive the piezoelectric element by means of a voltage signal of time-variable frequency and then to determine resonance frequencies from the extreme values of the electrical impedance profile. A frequency generator is provided in addition to a current and/or voltage detector for the purpose of generating the sinusoidal voltage signals.

SUMMARY

According to various embodiments, a method and a device for calibrating a piezoelectric actuator used in the automotive sector can be provided in order to be able to individually determine the operating-point-dependent, nonlinear dynamic behavior and if necessary take it into account during operation.

According to an embodiment, in a method for calibrating a piezoelectric actuator which is operated in a motor vehicle by means of a control circuit and an output stage and which acts as the final control element on a control valve, the piezoelectric actuator is energized during the operation of the control circuit and the output stage by application of an electrical calibration pulse lying in its large-signal range, the frequency of said calibration pulse being varied over time, and the associated electrical impedance profile is determined via the frequency and evaluated, the output stage being driven by the control circuit in such a way that the calibration pulse is generated.

According to a further embodiment, the resonance frequencies can be determined from the extreme values of the ascertained impedance profile and the piezoelectric coupling factor is derived therefrom, and wherein the coupling factor is used for determining the nonlinear material coefficients which the piezoelectric actuator has in the large-signal range. According to a further embodiment, the dielectric material coefficients of the piezoelectric actuator can be predefined in the large-signal range and are used together with the ascertained piezoelectric coupling factor for determining the nonlinear piezoelectric and/or elastic material coefficients. According to a further embodiment, at least one control parameter for controlling the piezoelectric actuator can be adapted as a function of the ascertained nonlinear material coefficients. According to a further embodiment, conclusions can be drawn about events or states in a mechanically movable device connected to the piezoelectric actuator by additional evaluation of further data present in the control circuit and/or ascertained by it. According to a further embodiment, at least one control parameter for controlling the piezoelectric actuator can be adapted as a function of the ascertained events or states. According to a further embodiment, the electrical voltage dropping at the piezoelectric actuator and the current consumed by the latter can be recorded in order to determine the impedance profile, wherein the piezoelectric actuator driven by the output stage is connected in series with a current-sensing resistor connected to ground. According to a further embodiment, the recorded voltage signal can be supplied to the analog input of an integrated microprocessor which digitizes the voltage signal by sampling and subsequently evaluates it.

According to another embodiment, a device, in particular a control device, for on-board calibration of a piezoelectric actuator operated in a motor vehicle and driving a control valve, may have means for performing the method as described above.

BRIEF DESCRIPTION OF THE DRAWINGS

Various embodiment are explained in more detail with reference to the accompanying drawing, in which.

DETAILED DESCRIPTION

According to various embodiments, a method for calibrating a piezoelectric actuator operated in a motor vehicle by means of a control circuit and an output stage, said actuator acting as a final control element on a control valve. The piezoelectric actuator is energized during operation (i.e. 'on-board' or 'online') of the control circuit and the output stage by means of an electrical calibration pulse lying in the large-signal range of the piezoelectric actuator, the frequency of which calibration pulse is varied over time. During the calibration pulse the associated frequency-dependent electrical impedance profile is determined and evaluated, the output stage being controlled by the control circuit during said time period in such a way that the special calibration pulse is generated instead of the normal drive pulses for actuating the piezoelectric actuator. In this way the individual behavior of the respective piezoelectric actuator in the large-signal range can be determined and recorded by means of easily measurable variables or also indirect variables, and consequently a calibration can be performed very precisely. By evaluation of the impedance behavior of the piezoelectric actuator it is possible to draw conclusions about the nonlinear characteristic variables of the piezoelectric element itself and/or external events in its environment.

According to an embodiment, the resonance frequencies ($f_p$, $f_s$) are determined from the extreme values of the ascertained impedance profile and the piezoelectric coupling factor $k_{eff}$ is derived therefrom. Said coupling factor is then used for determining the nonlinear material coefficients which the piezoelectric actuator has in the large-signal range.

According to a development of said embodiment variant that is considered particularly advantageous, the dielectric material coefficients of the piezoelectric actuator in the large-signal range are predefined and are used together with the ascertained piezoelectric coupling factor for determining the nonlinear piezoelectric and/or elastic material coefficients. The method can therefore advantageously be used in particular at times when, although a large-signal capacitance or large-signal dielectric constant is ascertained or specified elsewhere, the circumstances on the other hand permit no access to a corresponding small-signal capacitance or small-signal dielectric constant.

According to a further embodiment variant, at least one control parameter for controlling the piezoelectric actuator is adapted as a function of the ascertained nonlinear material coefficients. This has the advantage that the piezoelectric actuator can be controlled very precisely and in particular, when said actuator is used for metering fluid, the latter can be metered very precisely also in the case of minimal quantities.

Alternatively or in addition to the determination of the nonlinear behavior of the piezoelectric element itself, conclusions can be drawn about events or states in a mechanically movable device connected to the piezoelectric actuator by additional evaluation of further data present in the control circuit and/or ascertained by it. This can be developed in such a way that at least one control parameter for controlling the piezoelectric actuator is adapted as a function of the ascertained events or states. In addition to the piezoelectric element itself, this also enables the injector as a whole, for example, to be adjusted according to its current state, i.e. to be used according to its current and individual values during operation.

In order to determine the impedance profile it is favorable in the case of all the aforementioned embodiment variants to record the electrical voltage dropping at the piezoelectric actuator and the current consumed by the latter, wherein the piezoelectric actuator driven by the output stage is connected in series with a current-sensing resistor connected to ground. According to a development of the last-mentioned embodiment variant, the recorded voltage signal is supplied to the analog input of a processor which is preferably included in the control circuit and digitizes the voltage signal by sampling and subsequently evaluates it.

According to various other embodiments, a device for on-board calibration of a piezoelectric actuator operated in a motor vehicle comprises means for performing a method of the above-described type.

Figure 1:
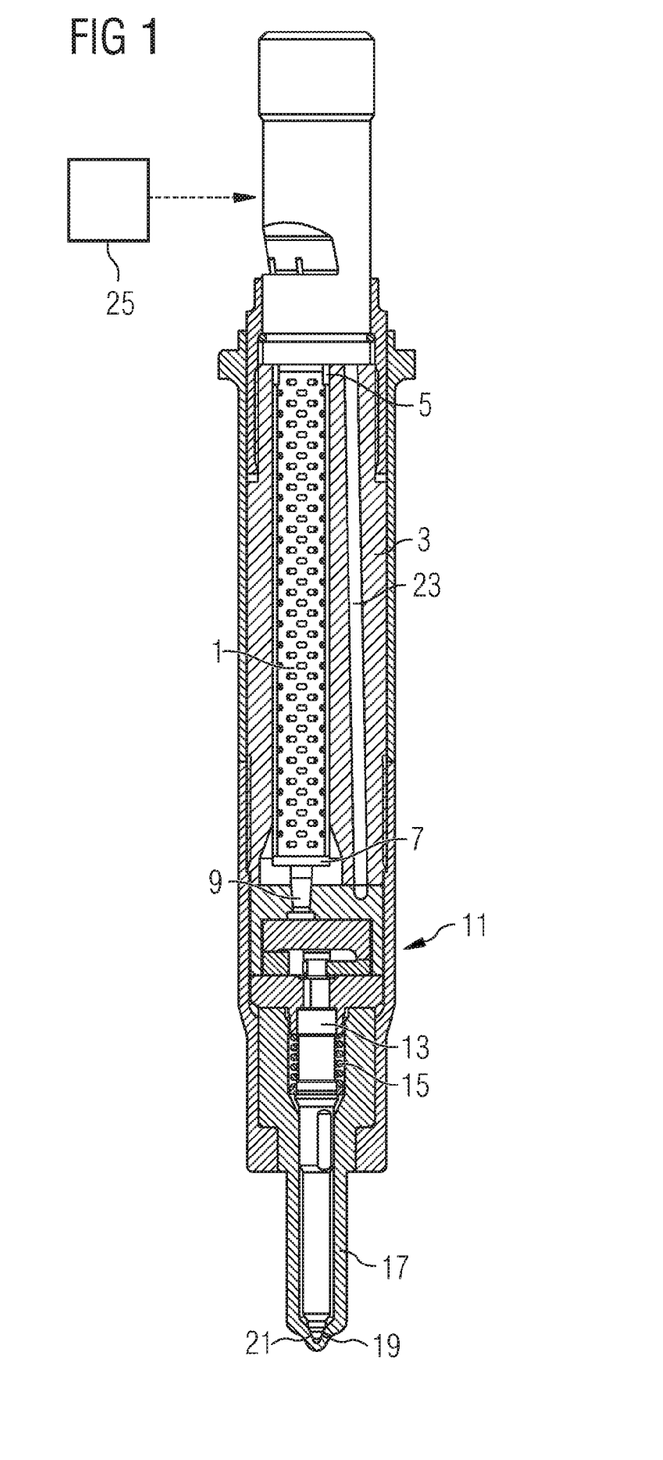
FIG. 1 shows an injector having a piezoelectric actuator and an associated control device.

The injection valve (injector) shown in FIG. 1 has a final control element which is embodied as a piezoelectric actuator 1. The piezoelectric actuator 1 has a number $n_L$ of piezoelectric elements. The number $n_L$ can amount to e.g. approximately 200. The piezoelectric actuator 1 has a first free end 5 and a second free end 7. The piezoelectric actuator 1 is fixed by means of its first free end 5 in a housing 3 of the injector, preferably by being welded in. In the region of its second free end 7 it acts on a control valve of the injector due to a prolongation of the piezoelectric actuator 1. The control valve comprises a pin 9 and a lever device 11 which preferably reverses the stroke of the piezoelectric actuator 1. The control valve also comprises a nozzle needle 13 which is coupled to a nozzle spring 15, and a nozzle body 17 in which there is formed a seat 19 for the nozzle needle 13. The nozzle spring 15 is arranged such that, without the action of forces produced by the final control element, it pretensions the nozzle needle in its closed position, in which the nozzle needle prevents a fluid flow through an injection aperture 21. Outside of the closed position the nozzle needle 13 releases the fluid flow through the injection aperture 21.

In addition the injection valve has a high-pressure fluid feed 23 via which the injection valve, in its assembled state, is preferably hydraulically coupled to a high-pressure fluid accumulator and through which the fluid can flow to the injection aperture 21. Whether the nozzle needle 13 is in its closed position or outside of the closed position depends on a balance of forces between the forces acting on it, caused by the force of the nozzle spring 15, of the forces coupled in via the pressure of the fluid on the nozzle needle, and of the force acting on it due to the piezoelectric actuator 1. As a result of the substantially direct coupling of the piezoelectric actuator 1 to the nozzle needle 13, a prolongation of the piezoelectric actuator takes effect in a change at the second free end 7 with regard to its position in relation to the axial housing region there directly on the position of the nozzle needle 13.

Data and programs executed during the normal operation of the injector are preferably stored in a memory of the control device 25 associated with the injection valve. The control device 25, which comprises a control circuit, a microprocessor and a memory, is also used for calibrating the piezoelectric actuator 1 and can also be referred to as a device for calibrating the piezoelectric actuator 1.

A program for calibrating the piezoelectric actuator 1 is stored in a memory of the control device 25 and is launched by the control circuit at predefinable time instants during the operation of the metering device. This can be the case, for example, each time after a predefined time interval has elapsed or also the case when predefined operating variables assume predefined values.

Figure 2:
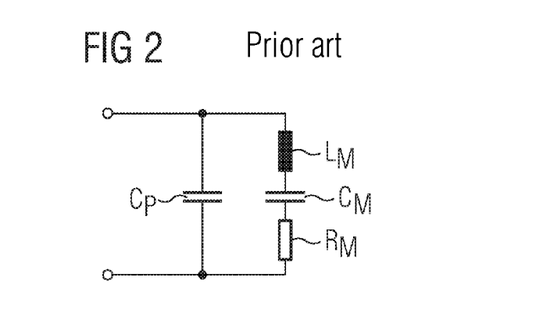
FIG. 2 shows a diagram of a known prior art equivalent circuit of a piezoelectric actuator having a series and a parallel resonant circuit.

In order to explain the method according to various embodiments, an equivalent circuit known per se is firstly illustrated in FIG. 2, by means of which circuit the resonant behavior of a piezoelectric element can be simulated electronically. It is well-known that piezoelectric oscillators are characterized by two different natural resonances in which the imaginary part of their impedance disappears. The (insulating) piezoceramic (and its contacting) initially constitutes a parallel-plate capacitor, i.e. a capacitor $C_P$. In parallel therewith it converts electrical into mechanical energy, which can be simulated by means of the mechanical branch of the circuit parallel to the capacitor $C_P$. In proximity to a point of resonance the behavior of the mechanical branch can be simulated by precisely three elements—an inductor, a capacitor and an ohmic resistor—see also FIG. 2. The values for $L_M$, $C_M$ and $R_M$ are obtained from the comparison of the differential equations for forced oscillations of electrical and mechanical systems. The series inductor then corresponds to the inert mass, the series capacitor to the elasticity, and the series resistor to the mechanical attenuation of the resonant circuit. The mechanical (low) resonance is defined by means of the series circuit of $L_M$, $C_M$ and $R_M$, where the so-called series resonance frequency $f_s$ corresponds to the frequency having minimum impedance in the series branch. The following applies to only weakly attenuated systems:

$$f_s = \frac{1}{2\pi} \sqrt{1/L_M C_M}$$

A second (higher) characteristic frequency is the resonance frequency of the overall circuit, i.e. of the mechanical branch with piezo capacitance $C_P$ connected in parallel therewith. This is referred to as the parallel resonance frequency:

$$f_P = \frac{1}{2\pi} \sqrt{C_P + C_M / L_M C_M C_P}$$

The effective coupling factor $k_{eff}$ is often used as a measure for the ability of a (piezoelectric) actuator to convert electrical energy into mechanical energy. It is defined as the square root of the ratio of electrical energy converted into mechanical energy to the electrical input energy:

$$k^2_{eff} = \text{converted energy/electrical input energy}$$

Since the energies are stored in the capacitors in the steady state, this can be calculated as follows:

$$k^2_{eff} = C_M/C_M + C_P$$

With the formulae for the series and parallel resonance frequency, the known relationship for calculating the coupling factor from the resonance frequencies is yielded:

$$k^2_{eff} = f_P^2 - f_s^2 / f_P^2$$

Figure 3:
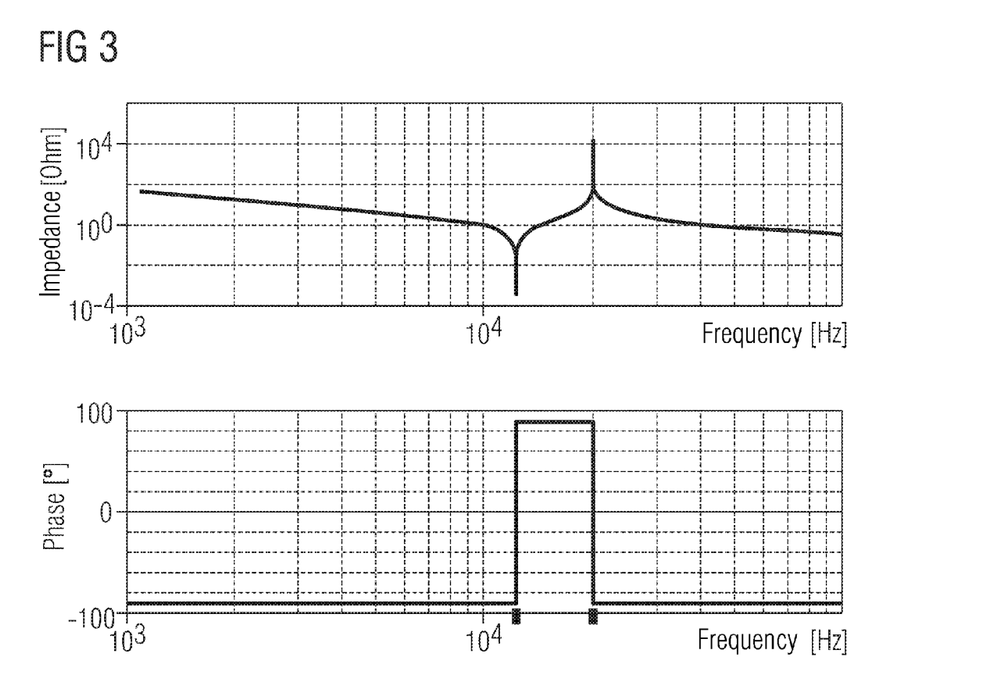
FIG. 3 shows a graph of the impedance profile of the piezoelectric actuator simulated by means of the resonant circuits according to FIG. 2.

In the top diagram of FIG. 3 the absolute value of the impedance is plotted against the frequency. This yields the known impedance profile having a minimum and a maximum, such that the two associated frequencies can be determined from the measured spectrum. For piezoceramics having a high coupling factor and a high quality, $f_{min,max}$ lie in a good approximation in the vicinity of the associated series and parallel resonance frequency.

In the bottom diagram of FIG. 3 the phase of the impedance is plotted against the frequency. The phase jump occurring in each case with the resonances is clearly evident.

The two following known formulae can be derived for the coupling factor:

$$k^2_{\mathit{eff}} = d^2_{33}/S^E_{33} * \in^T_{33}$$

$$k^2_{\mathit{eff}} = \in^T_{33} - \in^S_{33}/\in^T_{33}$$

In this case $\in^S_{33}$ denotes the small-signal dielectric constant, $\in^T_{33}$ the large-signal dielectric constant, $S^E_{33}$ denotes an elastic resilience of the piezoelectric actuator 1, and $d_{33}$ denotes the piezoelectric module of the piezoelectric actuator 1.

In the case of the impedance spectroscopy measurement methods known from the prior art, both the small- and the large-signal capacitance are usually recorded, with the result that the coupling factor can be eliminated from the two previously cited equations and a conclusion can be reached about the elastic resilience $S^E_{33}$ and/or the piezoelectric module $d_{33}$, in particular by solving an equation system which essentially contains a further equation which describes a relationship between $\Delta 1$ (piezo elongation), and $S^E_{33}$ and $d_{33}$. However, since it has become apparent that the measurement of the small-signal capacitance is too heavily dependent on interference effects, in particular $\Delta T$, the various embodiments instead follows the route of reaching conclusions about the further material coefficients $S^E_{33}$ and $d_{33}$ in the large-signal range via the explicit determination of the coupling factor and a predefined large-signal dielectric constant $\in^T_{33}$ (which can be determined e.g. from a measurement of the large-signal capacitance).

Accordingly it is possible, by online acquisition of the impedance profile in the large-signal range of a piezoelectric-controlled drive system and by evaluation of the impedance limits in the above-described sense, to calculate the piezoelectric coupling factor and to derive the nonlinear characteristic variables of the piezoelectric element therefrom.

The online acquisition is effected during the operation of the injection system by means of a suitable hardware circuit which, as output, outputs the continuous profile of the impedance as a voltage signal. The injection system includes an output stage—cf. the block circuit diagram shown in FIG. 4—which is routinely provided, as specified by the engine management, for generating the drive pulses for operating the piezoelectric actuators 1. Said output stage also generates, e.g. in accordance with how it is driven by a control circuit which can be part of the control device 25, the electrical calibration pulses which are applied to the piezoelectric actuator 1 in the injector 31. The signals of the calibration pulse are generated for measuring the impedance in chronological sequence such that the provided frequency range is covered (AC sweep). This takes place within a time period within which no metering of fluid through the injection aperture is provided, i.e. for example between two normal drive pulses. The duration and/or height of the calibration pulse is preferably determined as a function of at least one operating variable in such a way that it can be reliably ensured that applying the electrical calibration pulse to the piezoelectric actuator 1 does not cause the nozzle needle 13 to move away from its closed position, such that no undesired, normal activation is triggered. On the other hand the calibration pulse should lie in the large-signal range, in this case starting from approximately 100V/mm, since voltages of typically 100V to 200V are required for actuating a piezoelectric actuator for fuel injection valves.

Figure 4:
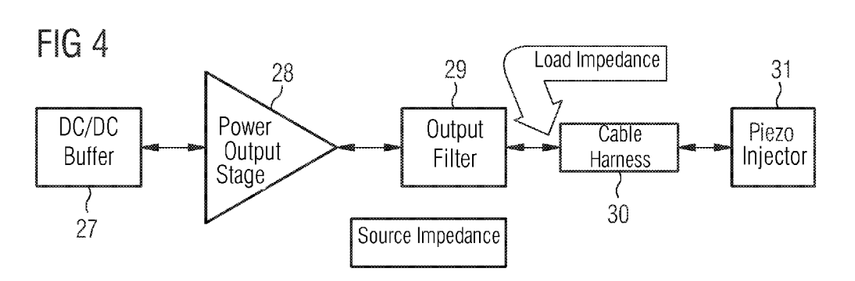
FIG. 4 shows a block diagram of a piezoelectric actuator driven by an output stage.

Also indicated in FIG. 4 are the relevant load impedance, the source impedance, and the cable harness 30 connecting the output stage to the piezoelectric injector 31.

The measured voltage signal is applied to a fast analog processor input which digitizes the signal by suitable sampling and determines the nonlinear characteristic variables by evaluating the impedance limits. Said characteristic variables can be fed as adaption variables (adaption of the material coefficients) for example to a piezo model in the engine management system. On the other hand conclusions can be drawn about events caused by external load inputs (e.g. start of movement of the nozzle needle) via further evaluations. The consideration of the output impedance, the control characteristics of the piezoelectric injector that are stored in the control device 25, and the load impedance with the mechanical-hydraulic reaction permits conclusions to be reached about force or path changes inside the injector. Toward that end it is necessary to know the control characteristics and take them into account in the calculation, in particular for separating the blind from the real part of the admittance.

Figure 5:
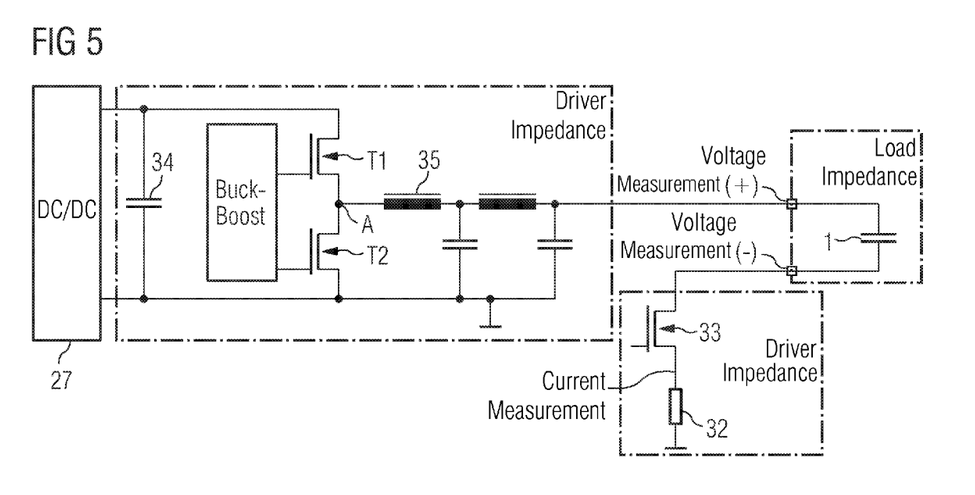
FIG. 5 shows a circuit diagram of a piezoelectric actuator driven by an output stage.

The modified output stage shown in FIGS. 4 and 5 is described in somewhat more detail below. What is important in this case is not the detailed circuitry layout of the output stage provided only by way of example, for which there are a multiplicity of variations in the prior art, but the fact that the output stage routinely provided for driving the piezoelectric element of the control valve in each case requires only minor modifications in order to implement the method according to various embodiments. These relate primarily to the implementation of the voltage measurement at the piezoelectric actuator 1 (ground-related voltage measurement V(+) or differential voltage measurement V(+)−V(−)) and the current measurement with the aid of the (very small) current-sensing resistor 32 which is arranged in a series circuit with the piezoelectric actuator 1 (and the selection switch 33 associated with the respective actuating element).

An output stage provided for normal control purposes that is similar to the type shown in FIGS. 3 and 4 is known per se from DE 10 2004 047 961 A1. Provided in the first instance is a DC/DC converter 27 which is fed by the vehicle electrical system and which delivers at its output side a high supply voltage (e.g. 200V) for the normal drive pulses and the calibration pulse. An intermediate circuit capacitor 34 (for dynamic buffering) is connected between the output of the DC/DC converter 27 and reference potential, and connected in parallel therewith is a power output stage 28, consisting of a series circuit having a charge and discharge switching transistor T1 and T2, each of which is controlled via a driver circuit (e.g. buck-boost converter) by means of a control signal of a control circuit which can be part of the control device 25. A coil 35 connected in series with the piezoelectric actuator 1 (which coil, together with a further coil and further capacitors, forms the output filter 29; cf. block circuit diagram of FIG. 4) can be connected via the connection point A of said switching transistors clock pulse by clock pulse either to the output voltage of the DC/DC converter 27 for charging or to reference potential 0V (ground) for discharging. In order to generate the normal drive pulses of the injection valves and also the calibration pulse, corresponding control signals are output by the control circuit and converted by the switching transistors T1 and T2 (and the selection switches 33).

What is claimed is:

1. A method for calibrating a piezoelectric actuator which is operated in a motor vehicle by means of a control circuit and an output stage and which acts as the final control element on a control valve, the method comprising:
   energizing the piezoelectric actuator during the operation of the control circuit and the output stage by:

application of a series of normal drive pulses to the piezoelectric actuator, each providing a metering of fuel by movement of the piezoelectric actuator, and between two sequential normal drive pulses, application of an electrical calibration pulse lying in a large-signal range, the calibration pulse not providing a metering of fuel by movement the piezoelectric actuator, varying the frequency of said calibration pulse through a predefined frequency range during and within the calibration pulse, measuring a voltage at the piezoelectric actuator during the calibration pulse, measuring a current through the piezoelectric actuator during the calibration pulse using a current-sensing resistor arranged in series with the piezoelectric actuator, calculating an electrical impedance profile for the calibration pulse based on the measured voltage and measured current, and evaluating the calculated electrical impedance profile to determine resonance frequencies and a piezoelectric coupling factor, wherein the output stage is driven by the control circuit in such a way that the calibration pulse is generated.

2. The method according to claim 1, wherein resonance frequencies are determined from extreme values of the ascertained impedance profile and the piezoelectric coupling factor is derived therefrom, and wherein the coupling factor is used for determining nonlinear material coefficients which the piezoelectric actuator has in the large-signal range.

3. The method according to claim 2, wherein dielectric material coefficients of the piezoelectric actuator are predefined in the large-signal range and are used together with the ascertained piezoelectric coupling factor for determining at least one of the nonlinear piezoelectric and elastic material coefficients.

4. The method according to claim 2, wherein at least one control parameter for controlling the piezoelectric actuator is adapted as a function of the ascertained nonlinear material coefficients.

5. The method according to claim 1, further comprising evaluating further data which are at least one of present in the control circuit and ascertained by the control circuit to draw conclusions about events or states in a mechanically movable device connected to the piezoelectric actuator.

6. The method according to claim 5, further comprising adapting at least one control parameter for controlling the piezoelectric actuator as a function of the conclusions drawn about events or states.

7. The method according to claim 1, wherein the recorded voltage signal is supplied to the analog input of an integrated microprocessor which digitizes the voltage signal by sampling and subsequently evaluates it.

8. A device for on-board calibration of a piezoelectric actuator operated in a motor vehicle and driving a control valve, comprising:

a control circuit, and an output stage, wherein the piezoelectric actuator is energized during the operation of the control circuit and the output stage by (a) application of a series of normal drive pulses to the piezoelectric actuator, each providing a metering of fuel by movement of the piezoelectric actuator, and (b) between two sequential normal drive pulses, application of an electrical calibration pulse lying in a large-signal range, the calibration pulse not providing a metering of fuel by movement the piezoelectric actuator, wherein the frequency of said calibration pulse is varied through a predefined frequency range during and within the calibration pulse, wherein a voltage at the piezoelectric actuator is measured during the calibration pulse, wherein a current through the piezoelectric actuator is measured during the calibration pulse using a current-sensing resistor arranged in series with the piezoelectric actuator, wherein an electrical impedance profile for the calibration pulse is calculated based on the measured voltage and measured current, and wherein the calculated electrical impedance profile is evaluated to determine resonance frequencies and a piezoelectric coupling factor, wherein the output stage is driven by the control circuit in such a way that the calibration pulse is generated.

9. The device according to claim 8, wherein resonance frequencies are determined from extreme values of the ascertained impedance profile and the piezoelectric coupling factor is derived therefrom, and wherein the coupling factor is used for determining nonlinear material coefficients which the piezoelectric actuator has in the large-signal range.

10. The device according to claim 9, wherein dielectric material coefficients of the piezoelectric actuator are predefined in the large-signal range and are used together with the ascertained piezoelectric coupling factor for determining at least one of the nonlinear piezoelectric and elastic material coefficients.

11. The device according to claim 9, wherein at least one control parameter for controlling the piezoelectric actuator is adapted as a function of the ascertained nonlinear material coefficients.

12. The device according to claim 8, wherein conclusions can be drawn about events or states in a mechanically movable device connected to the piezoelectric actuator by additional evaluation of further data which are at least one of present in the control circuit and ascertained by the control circuit.

13. The device according to claim 12, wherein at least one control parameter for controlling the piezoelectric actuator is adapted as a function of the ascertained events or states.

14. The device according to claim 13, wherein the recorded voltage signal is supplied to the analog input of an integrated microprocessor which digitizes the voltage signal by sampling and subsequently evaluates it.

15. A system for calibrating a piezoelectric actuator which is operated in a motor vehicle comprising:

a control circuit, and an output stage acting as the final control element on a control valve, wherein the control circuit drives the output stage to energize the piezoelectric actuator by:

(a) application of a series of normal drive pulses to the piezoelectric actuator, each providing a metering of fuel by movement of the piezoelectric actuator, and (b) between two sequential normal drive pulses, application of an electrical calibration pulse lying in a large-signal range, the calibration pulse not providing a metering of fuel by movement the piezoelectric actuator, wherein the control circuit is further operable to:
vary the frequency of said calibration pulse through a predefined frequency range during and within the calibration pulse,
measure a voltage at the piezoelectric actuator during the calibration pulse, and
measure a current through the piezoelectric actuator during the calibration pulse using a current-sensing resistor arranged in series with the piezoelectric actuator,
further comprising means to calculate an electrical impedance profile for the calibration pulse based on the measured voltage and measured current, and evaluate the calculated electrical impedance profile to determine resonance frequencies and a piezoelectric coupling factor.

16. The system according to claim 15, wherein the means for determining the associated electrical impedance profile are operable to determine a voltage applied to the piezoelectric actuator and a current through said piezoelectric actuator.

17. The system according to claim 15, wherein resonance frequencies are determined from extreme values of the ascertained impedance profile and the piezoelectric coupling factor is derived therefrom, and wherein the coupling factor is used for determining nonlinear material coefficients which the piezoelectric actuator has in the large-signal range.

18. The system according to claim 17, wherein dielectric material coefficients of the piezoelectric actuator are predefined in the large-signal range and are used together with the ascertained piezoelectric coupling factor for determining the nonlinear piezoelectric and/or elastic material coefficients.

* * * * *